US012020409B2

(12) United States Patent
Caballero et al.

(10) Patent No.: US 12,020,409 B2
(45) Date of Patent: Jun. 25, 2024

(54) BLUR CORRECTION SYSTEM

(71) Applicant: The Boeing Company, Chicago, IL (US)

(72) Inventors: David L. Caballero, Huntington Beach, CA (US); Amir L. Liaghati, Irvine, CA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 18/052,034

(22) Filed: Nov. 2, 2022

(65) Prior Publication Data

US 2024/0144448 A1 May 2, 2024

(51) Int. Cl.
*G06T 5/73* (2024.01)

(52) U.S. Cl.
CPC ..................... *G06T 5/73* (2024.01)

(58) Field of Classification Search
CPC ...... H04N 19/154; H04N 19/86; H04N 19/89; G06T 5/70; G06T 5/73; G06T 5/75; G06T 2207/20201
See application file for complete search history.

(56) References Cited

U.S. PATENT DOCUMENTS

| | | | | |
|---|---|---|---|---|
| 6,330,371 | B1 * | 12/2001 | Chen | G01S 3/7864 382/218 |
| 6,970,597 | B1 * | 11/2005 | Olding | G06T 3/4015 382/167 |
| 7,426,848 | B1 * | 9/2008 | Li | G01N 27/70 73/23.2 |
| 2008/0088858 | A1 * | 4/2008 | Marcu | H04N 1/407 358/1.6 |
| 2008/0089580 | A1 * | 4/2008 | Marcu | H04N 1/603 382/162 |
| 2011/0261178 | A1 * | 10/2011 | Lo | A61B 90/361 348/E7.085 |
| 2014/0294319 | A1 * | 10/2014 | Yang | G06T 5/73 382/266 |

OTHER PUBLICATIONS

Ramakrishnan, "Detection and Estimation of Image Blur," Masters Thesis, Missouri University Of Science And Technology, 2010, 83 pages.

* cited by examiner

*Primary Examiner* — Chiawei Chen
(74) *Attorney, Agent, or Firm* — Yee & Associates, P.C.

(57) ABSTRACT

A method for blur correction determines a first constant for a first pixel segment and a second constant for a second pixel segment for each of the multipliers that results in a first mean error for the first pixel segment being and a second mean error for the second pixel segment being within a mean error threshold. A first multiplier is selected from the multipliers with the corresponding first constant for the first pixel segment and second multiplier is selected from the multipliers with the corresponding second constant for the second segment that has the probability of the frames with the measured ranges being within the selected error threshold. A data file comprising the first multiplier, the corresponding first constant for the first multiplier, the second multiplier, and the corresponding second constant for the second multiplier is created for a platform computer system for a platform.

21 Claims, 13 Drawing Sheets $$\text{Segment1 SCORE} = \sum_{k=min}^{seg_{size}-1} \frac{n_k}{N} \times W - \sum_{k=seg_{size}}^{max} \frac{n_k}{N} \times W$$

$$\text{Segment2 SCORE} = -\sum_{k=min}^{seg_{size}-1} \frac{n_k}{N} \times W + \sum_{k=seg_{size}}^{max} \frac{n_k}{N} \times W$$

BLUR CORRECTION SYSTEM

BACKGROUND INFORMATION

1. Field

The present disclosure relates generally to an improved computer system and in particular, to a method, apparatus, system, and computer program product for blur correction in images.

2. Background

The range of objects can be determined using images. An image generated by a camera can have blur. Blur in an image can cause the measured range to be incorrect. When an image generated by the camera is converted into a binary image in which the object is in the foreground using white in the binary image and the rest of the image is of the background using black in the binary image. This binary image is also referred to as a silhouette image.

For example, the image of the object is converted into a binary form for range analysis. When blur is present in the image, the object in the binary image can be larger than the actual geometric image because of the blur. Blur can also vary as a function of intensity.

As result, blur can cause a range measurement error because the pixel size of the object is used in range calculations to measure the range to the object using the image. With blur, the range measurement can be smaller than the actual range.

Therefore, it would be desirable to have a method and apparatus that take into account at least some of the issues discussed above, as well as other possible issues. For example, it would be desirable to have a method and apparatus that overcome a technical problem with range measurements being less accurate from blur in images.

SUMMARY

An embodiment of the present disclosure provides a method for blur correction. A first constant for a first pixel segment is determined for each of a plurality of multipliers and a second constant for a second pixel segment for each of the plurality of multipliers that results in a first mean error for the first pixel segment being within a mean error threshold and a second mean error for the second pixel segment being within the mean error threshold. Each of the plurality of multipliers and a corresponding first constant are used to determine a first blur radius for the first pixel segment and each of the plurality of multipliers and a corresponding second constant are used to determine a second blur radius for a second segment. A first multiplier is selected from the plurality of multipliers with the corresponding first constant for the first pixel segment that has a probability of frames with measured ranges being within a selected error threshold. A second multiplier is selected from the plurality of multipliers with the corresponding second constant for the second segment that has the probability of the frames with the measured ranges being within the selected error threshold. A data file comprising the first multiplier, the corresponding first constant for the first multiplier, the second multiplier, and the corresponding second constant for the second multiplier is created for use in a platform computer system for a platform. According to other illustrative embodiments, a computer system and a computer program product for blur correction are provided.

In another illustrative embodiment, a method for blur correction is provided. A constant for pixel segment is determined for each of a plurality of multipliers that results in a mean error for the pixel segment being within a mean error threshold. Each of the plurality of multipliers and a corresponding constant are used to determine a blur radius for the pixel segment. A multiplier from the plurality of multipliers with the corresponding first constant for the pixel segment that has a probability of images with measured ranges being within a selected error threshold. A data file comprising the first multiplier and the corresponding first constant for the first multiplier is created for use in a platform computer system for a platform. According to other illustrative embodiments, a computer system and a computer program product for blur correction are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
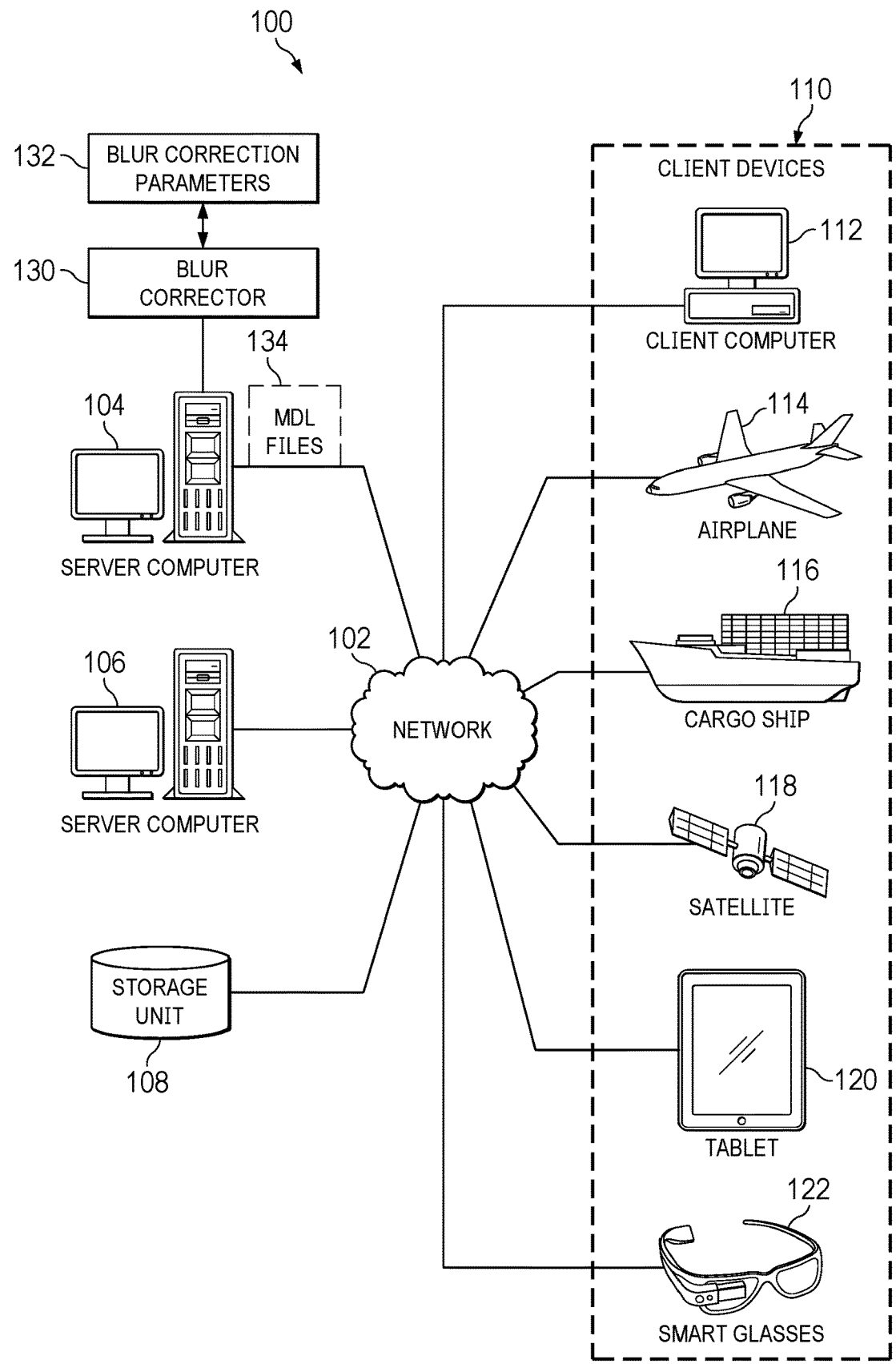
FIG. 1 is a pictorial representation of a network of data processing systems in which illustrative embodiments may be implemented.

The illustrative embodiments recognize and take into account one or more different considerations as described herein. For example, the illustrative embodiments recognize and take into account that in obtaining a measurement range that is closer to the actual range, the extents of an object can be increased because of blur. The extent of an object can be in a X direction and in a Y direction in the binary image.

This increase in the extents results in the object being larger. The issue with blur increases as the intensity of the image increases. As a result, the blur can cause a range determination that is biased from the actual range. In other words, with the increase in size of the extents of the object, the determination of the range for the object can indicate that the object is closer than the actual range to the object.

Corrections for blur in the image can be made. Currently, a human operator can manually select values for parameters used in blur correction. These parameters include a multiplier (M) and a constant (C) used in a blur equation that calculates blur. These values can be selected to compensate for the error introduced by blur in the image generated by the camera. Currently, selected parameters run in a vision algorithm that is used to make the range determination. A vision algorithm can be, for example, a STAR Silhouette algorithm. The vision algorithm can cluster pixels in a manner that results in a silhouette for the object.

The measured ranges obtained from using the selected parameters to correct for blur can be compared to the actual range measurements for test images. This adjustment can be repeatedly made to the parameters until the human operator finds parameters that provide a desired level of correction.

This type of process, however, is inefficient and repetitive. Further, this process is extremely time-consuming for human operator. Thus, the illustrative examples provide a method, apparatus, system, and computer program product that identify blur correction parameters more efficiently and accurately as compared to current techniques.

Thus, the illustrative embodiments provide a method, apparatus, system, and computer program product for blur correction in accordance with an illustrative embodiment. In one illustrative example, a method for blur correction is provided. A first constant for a first pixel segment is determined for each of a plurality of multipliers and a second constant for a second pixel segment for each of the plurality of multipliers that results in a first mean error for the first pixel segment being within a mean error threshold and a second mean error for the second pixel segment being within the mean error threshold. Each of the plurality of multipliers and a corresponding first constant are used to determine a first blur radius for the first pixel segment and each of the plurality of multipliers and a corresponding second constant are used to determine a second blur radius for a second segment. A first multiplier is selected from the plurality of multipliers with the corresponding first constant for the first pixel segment that has a probability of frames with measured ranges being within a selected error threshold. A second multiplier is selected from the plurality of multipliers with the corresponding second constant for the second segment that has the probability of the frames with the measured ranges being within the selected error threshold. A data file comprising the first multiplier, the corresponding first constant for the first multiplier, the second multiplier, and the corresponding second constant for the second multiplier is created for use in a platform computer system for a platform. According to other illustrative embodiments, a computer system and a computer program product for blur correction are provided.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. Client devices 110 can be, for example, computers, workstations, network computers, or other objects that include data processing capabilities. In the depicted example, server computer 104 provides information, such as boot files, operating system images, and applications to client devices 110.

In this example, client devices 110 comprise client computer 112, airplane 114, cargo ship 116, satellite 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, client devices 110 such as airplane 114, cargo ship 116, and satellite 118 include sensor systems that can be used to determine distance to objects.

For example, these client devices can include cameras that generate images of objects, and the client devices can determine distances to the objects using the images by the cameras. Properties of the cameras in these client devices can result in blur in the images generated by the cameras. For example, the blur of an object in an image generated by a camera can result in error when determining a distance arrange to the object using the image. Each camera can generate different amounts of blur based on characteristics of the camera. Further, the amount of blur can change as a function of intensity for the image.

In these illustrative examples, airplane 114, cargo ship 116, and satellite 118 can include blur correction processes to correct for the blur caused by the cameras in airplane 114, cargo ship 116, and satellite 118. This correction can be performed such that the measured range objects using the images the objects from the cameras are closer to the actual range to the objects.

To correct for blur in for cameras in airplane 114, cargo ship 116, and satellite 118, blur correction parameters 132 are needed for the blur correction processes. The values for blur correction parameters 132 can be different for each camera within a client device and between client devices.

In this illustrative example, blur corrector 130 is located in server computer 104. Blur corrector 130 can generate blur correction parameters 132 used to correct for the blur in images generated by the cameras in airplane 114, cargo ship 116, and satellite 118.

In this illustrative example, blur corrector 130 can determine blur correction parameters 132 in a manner that is more efficient and accurate as compared to current techniques.

Blur correction parameters 132 can be placed into mission data loader (MDL) files 134. As depicted, mission data loader files 134 are sent over network 102 for uploading into airplane 114, cargo ship 116, and satellite 118. With blur correction parameters 132, these client devices can calculate the blur expected and correct for that blur. As a result, increased accuracy can be achieved by airplane 114, cargo ship 116, and satellite 118 when measuring ranges to objects using images generated by cameras for these client devices.

Figure 2:
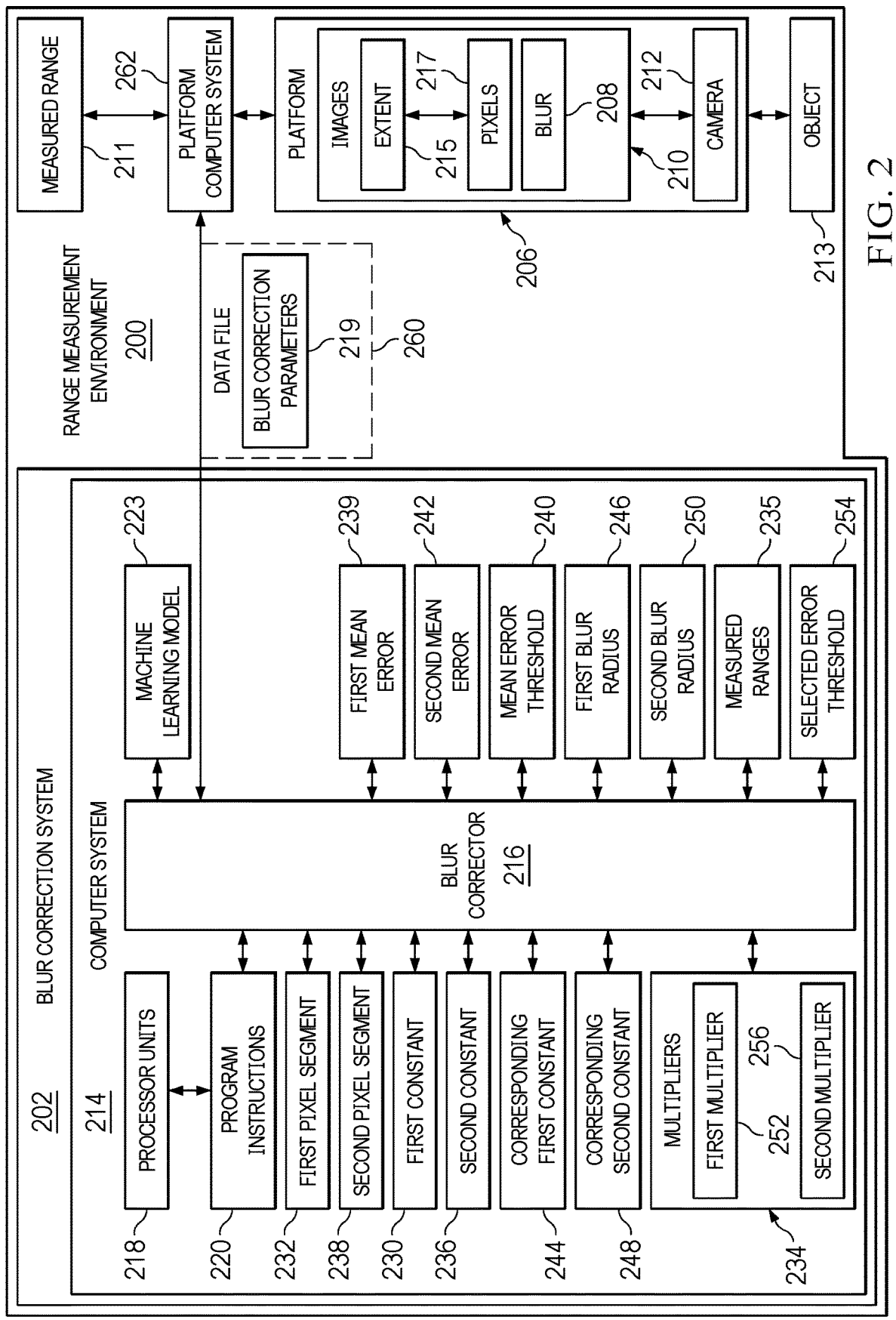
FIG. 2 is an illustration of a block diagram of a range measurement environment in accordance with an illustrative embodiment.

With reference now to FIG. 2, an illustration of a block diagram of a range measurement environment is depicted in accordance with an illustrative embodiment. In this illustrative example, range measurement environment 200 includes components that can be implemented in hardware such as the hardware shown in network data processing system 100 in FIG. 1.

As depicted, blur correction system 202 in range measurement environment 200 can determine blur correction parameters 204 for use by platform 206 to reduce errors caused by blur 208. In this illustrative example, blur 208 can be present in images 210 generated by camera 212 in platform 206. In this example, blur 208 is an optical blur. Blur 208 can change with different intensities. Blur 208 is not a result of camera movement in this depicted example. Images 210 can include object 213, and images 210 can be a sequence of images referred to as frames.

In this example, platform computer system 262 for platform 206 can use images 210 to determine measured range 211 to object 213. The determination of measured range 211 by platform computer system 262 can be made using blur correction parameters 219 to increase the accuracy of measured range 211.

In this illustrative example, blur correction system 202 generates blur correction parameters 219 for use by platform computer system 262. As depicted, blur correction system 202 comprises computer system 214 and blur corrector 216. Blur corrector 216 is located in computer system 214.

Blur corrector 216 can be implemented in software, hardware, firmware or a combination thereof. When software is used, the operations performed by blur corrector 216 can be implemented in program instructions configured to run on hardware, such as a processor unit. When firmware is used, the operations performed by blur corrector 216 can be implemented in program instructions and data and stored in persistent memory to run on a processor unit. When hardware is employed, the hardware may include circuits that operate to perform the operations in blur corrector 216.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 214 is a physical hardware system and includes one or more data processing systems. When more than one data processing system is present computer system 214, those data processing systems are in communication with each other using a communications medium. The communications medium may be a network. The data processing systems may be selected from at least one of a computer, a server computer, a tablet, or some other suitable data processing system.

As depicted, computer system 214 includes a number of processor units 218 that are capable of executing program instructions 220 implementing processes in the illustrative examples. In other words, program instructions 220 are computer readable program instructions.

As used herein a processor unit in the number of processor units 218 is a hardware device and is comprised of hardware circuits such as those on an integrated circuit that respond and process instructions and program code that operate a computer. When the number of processor units 218 execute program instructions 220 for a process, the number of processor units 218 is one or more processor units that can be on the same computer or on different computers. In other words, the process can be distributed between processor units on the same or different computers in a computer system 214. Further, the number of processor units 218 can be of the same type or different type of processor units 218. For example, a number of processor units 218 can be selected from at least one of a single core processor, a dual-core processor, a multi-processor core, a general-purpose central processing unit (CPU), a graphics processing unit (GPU), a digital signal processor (DSP), or some other type of processor unit.

In one illustrative example, blur corrector 216 determines first constant 230 for first pixel segment 232 for each of a plurality of multipliers 234 and second constant 236 for second pixel segment 238 for each of the plurality of multipliers 234 that results in first mean error 239 for first pixel segment 232 being within mean error threshold 240 and second mean error 242 for second pixel segment 238 being within mean error threshold 240. In this example, first pixel segment 232 is for a longer range than second pixel segment 238. In other words, these two pixel segments can be selected based on ranges to object 213. As result, the particular pixel segment used can be based on extent 215 of pixels 217 for the shape of object 213 in images 210.

In this example, each of the plurality of multipliers 234 and corresponding first constant 244 are used to determine first blur radius 246 for first pixel segment 232 and each of the plurality of multipliers 234 and corresponding second constant 248 are used to determine second blur radius 250 for second pixel segment 238.

Further, blur corrector 216 selects first multiplier 252 from plurality of multipliers 234 with corresponding first constant 244 for first pixel segment 232 that has a probability of images 210 with measured ranges 235 being within selected error threshold 254. Blur corrector 216 also selects second multiplier 256 from plurality of multipliers 234 with corresponding second constant 248 for second pixel segment 238 that has the probability of images 210 with measured ranges 235 being within selected error threshold 254.

In this illustrative example, selected error threshold 254 is an error threshold that provides a desired level accuracy for measured ranges 235 in images 210. For example, selected error threshold 254 can be such that the use of first multiplier 252 and second multiplier 256 result in the highest number of images 210 having a smaller error such as 10%, 15%, or some other threshold.

For example, with selected error threshold 254 of 10%, the multiplier can be selected as the one having the highest number of images that are within the 10% error. If one multiplier results in 85% of images 210 being within a 10% error and another multiplier results in 95% of images 210 being within the 10% error, the multiplier with 95% of images 210 within the 10% error is considered to be within selected error threshold 254 and is selected for use as a blur correction parameter.

In one illustrative example, the selection of constants and multipliers meeting selected error threshold 254 can be performed using machine learning model 223. Machine learning model 223 can be trained to perform the selection of contents and multipliers that optimize the reduction of errors.

A machine learning model is a type of artificial intelligence model that can learn without being explicitly programmed. A machine learning model can learn based training data input into the machine learning model. The machine learning model can learn using various types of machine learning algorithms. The machine learning algorithms include at least one of a supervised learning, and unsupervised learning, a feature learning, a sparse dictionary learning, an anomaly detection, a reinforcement learning, a recommendation learning, or other types of learning algorithms. Examples of machine learning models include an artificial neural network, a convolutional neural network, a decision tree, a support vector machine, a regression machine learning model, a classification machine learning model, a random forest learning model, a Bayesian network, a genetic algorithm, and other types of models. These machine learning models can be trained using data and process additional data to provide a desired output.

Blur corrector 216 creates data file 260 comprising blur correction parameters 219 for use in platform computer system 262 for platform 206. In this example, blur correction parameters 219 comprise first multiplier 252, corresponding first constant 244 for first multiplier 252, second multiplier 256, and corresponding second constant 248 for second multiplier 256. In this example, blur corrector 216 can upload data file 260 to platform computer system 262 for platform 206.

In this illustrative example, platform computer system 262 can be located in platform 206. In another illustrative example, platform computer system 262 can be in another location and in communication with platform 206. For example, platform computer system 262 can be in a ground station or another platform and provide processing power to determine measured range 211.

In one example, a vision measurement algorithm can match a detected object in an image to a best match library image in range library 272. This library comprises library images with associated scaling information. Associated scaling information can include extents and ranges for the extents. This information can be used to perform scaling with measurements made from images 210 to obtain measured range 211 for object 213.

In this example, the matching is performed using a silhouette or binary version of images 210 for comparison to library images in range library 272. Once a best match is found to the library image, the process can use image scale to determine the range to the object.

In one illustrative example, one or more technical solutions are present that overcome a technical problem with correcting for blur in images use for measuring ranges to an object. As a result, one or more technical solutions may provide a technical effect in enabling determining blur correction parameters more accurately and quickly as compared to current techniques. In this illustrative example, blur corrector 216 can determine multipliers and constants for use in correcting blur in images of objects such that the measured ranges to those objects can be determined more accurately.

Computer system 214 can be configured to perform at least one of the steps, operations, or actions described in the different illustrative examples using software, hardware, firmware or a combination thereof. As a result, computer system 214 operates as a special purpose computer system in which blur corrector 216 in computer system 214 enables determining measured ranges more accurately as compared to current techniques. In particular, blur corrector 216 transforms computer system 214 into a special purpose computer system as compared to currently available general computer systems that do not have blur corrector 216.

Figure 3:
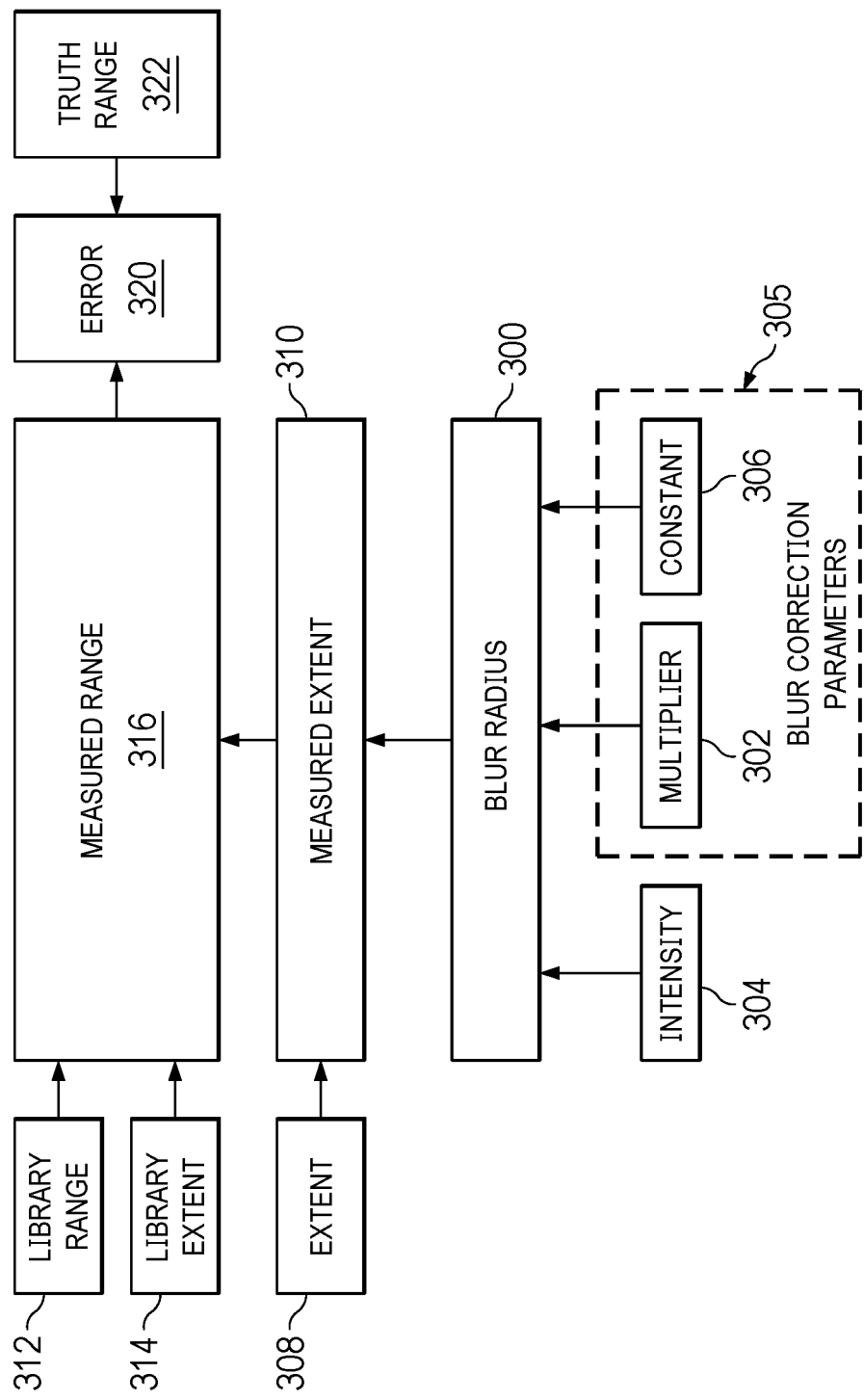
FIG. 3 is an illustration of a dataflow diagram for blur correction in accordance with an illustrative embodiment.

With reference next to FIG. 3, an illustration of a dataflow diagram for blur correction is depicted in accordance with an illustrative embodiment. In the illustrative examples, the same reference numeral may be used in more than one figure. This reuse of a reference numeral in different figures represents the same element in the different figures.

In this illustrative example, dataflow for a blur corrector 216 to selects blur correction parameters 305 is depicted. In this example, blur correction parameters 305 generated by blur corrector 216 is used to correct for blur 208 in images of object 213.

As depicted, blur radius 300 is calculated using multiplier 302, intensity 304, and constant 306 in the following equation BR=M*ln(intensity)+C, where BR is blur radius 300, M is multiplier 302, intensity is intensity 304, and C is constant 306. In this example, multiplier 302 and constant 306 are blur correction parameters 305 determined by blur corrector 216.

In this example, two times blur radius 300 is subtracted from extent 308 resulting in measured extent 310. Extent 308 is the number of pixels of the object in either Xextent in the x direction or Yextent in y direction in the image. In the illustrative examples, the extent 308 can be the longer of Xextent and Yextent.

As a result, measured extent 310 is the measured extent of the object in the image that has been corrected for blur using blur radius 300.

Measured extent 310, library range 312 and library extent 314 are be used to determine measured range 316 as follows:

$$\text{Range}_{measured} = (\text{Range}_{libary} = \text{Extent}_{libary}) / \text{Extent}_{measured}$$

where $\text{Range}_{measured}$ is measured range 316, $\text{Extent}_{measured}$ measured extent 310, $\text{Range}_{libary}$ is library range 312, and $\text{Extent}_{libary}$ is library extent 314.

In this example, library range 312 and library extent 314 are values generated using an image for object 213 at a known range. This image can be a library image in the form of a binary or silhouette image. The range is the distance to the object. This distance can be measured in, for example, meters or some other units.

In this illustrative example, library extent 314 can be either the Xextent, the Yextent, or both from an image of object 213 generated at library range 312. These values can be used to determine measured range 316 from measured extent 310 determined from an image in images 210 of object 213. As a result, accuracy in determining blur radius 300 affects the accuracy of measured range 316.

In this depicted example, blur corrector 216 uses multiplier 302 and constant 306 to reduce error 320. Error 320 can be determined using measured range 316 and truth range 322.

In this illustrative example, truth range 322 is the actual range to object 213 for the image from which extent 308 was identified. Error 320 can be determined for images to obtain a mean error such as first mean error 239 and second mean error 242 in FIG. 2. In this example, mean error is the average error for a data set such as images 210.

As result, the identification of error 320 can be used to adjust multiplier 302 and constant 306 and blur correction parameters 305 to reduce error 320. When error 320 is at a desired level such as within selected error threshold 254, then blur correction parameters 305 can be finalized for use in determining measured range 316 with increased accuracy.

The illustration of range measurement environment 200 in the different components in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data file 260 can also include a library of known extents for shapes of objects corresponding to known ranges to the objects. In this example, first multiplier 252, second multiplier 256, and corresponding second constant 248 can be for a particular object in the library. Blur corrector 216 can determine additional multipliers and corresponding constants for each of the objects in the library such that blur correction can be performed for each of the objects.

In some illustrative examples, a multiplier and a constant can be selected for a single pixel segment instead of two pixel segments. In yet other examples, multipliers and corresponding constants can be determined by blur corrector 216 for three or more pixel segments.

Figure 4:
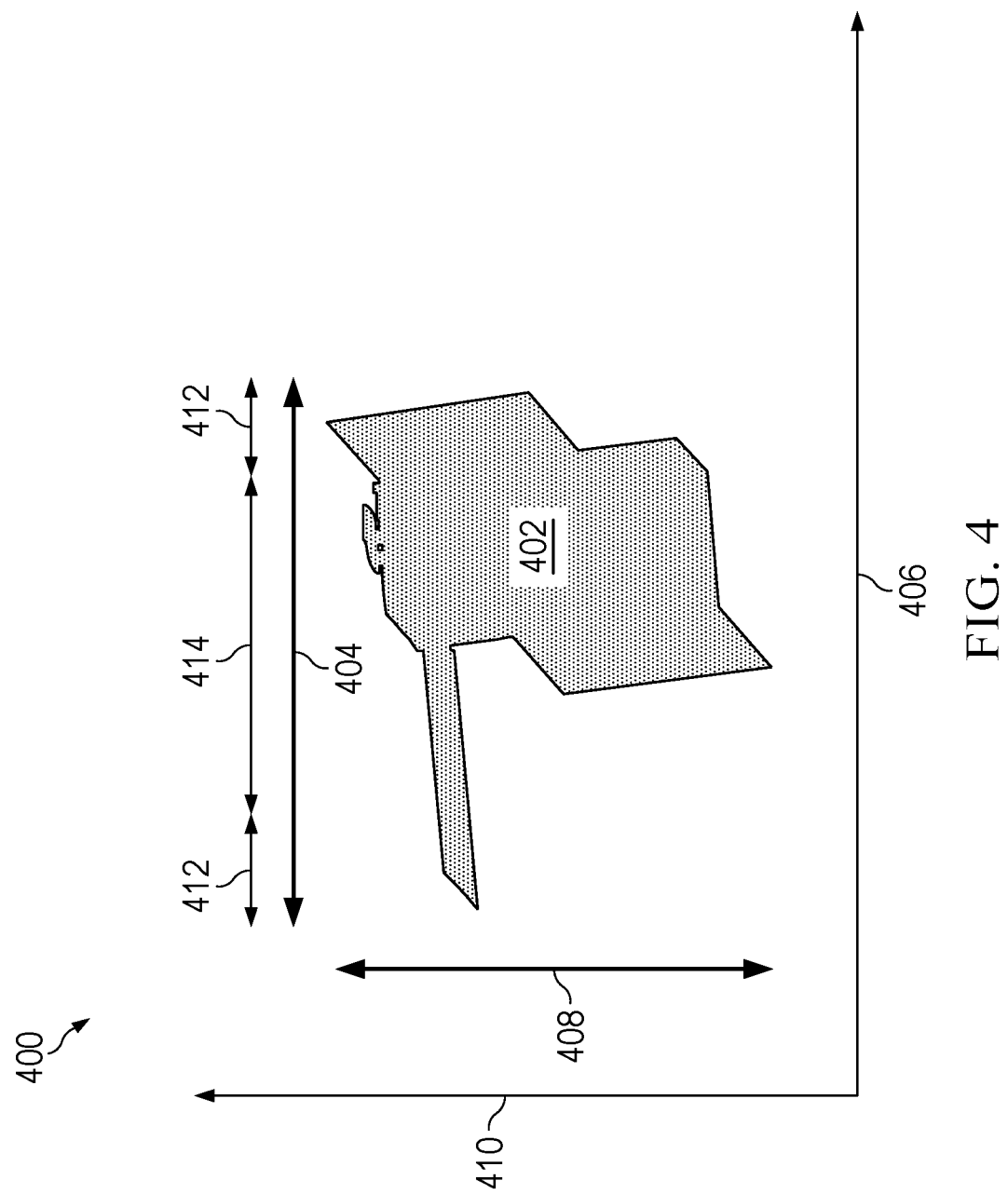
FIG. 4 an illustration of extents in a binary image in accordance with an illustrative embodiment.

With reference next to FIG. 4, an illustration of extents in a binary image is depicted in accordance with an illustrative embodiment. In this illustrative example, binary image 400 is an example of image generated using images 210.

As depicted, binary image 400 includes object 402 which is a silhouette of a satellite. Binary image 400 can be processed to determine a range to object 402. This range is a measured range in the depicted example.

As depicted in binary image 400, X extent 404 comprises the number of pixels for object 402 in the direction of X axis 406. In this example, Y extent 408 comprises the number of pixels for object 402 in the direction of Y axis 410. X extent 404 and Y extent 408 are an example of extent 308 in FIG. 3.

In this illustrative example, blur radius 412 is present and can be subtracted from an extent such as X extent 404 resulting in measured extent 414. Blur radius 412 is an example of blur radius 300 in FIG. 3. Measured extent 414 is an example of measured extent 310 in FIG. 3. A similar correction can be performed for Y extent 408. In one illustrative example, the selected extent for use in determining the measured range can be the extent that is longest.

Figure 5:
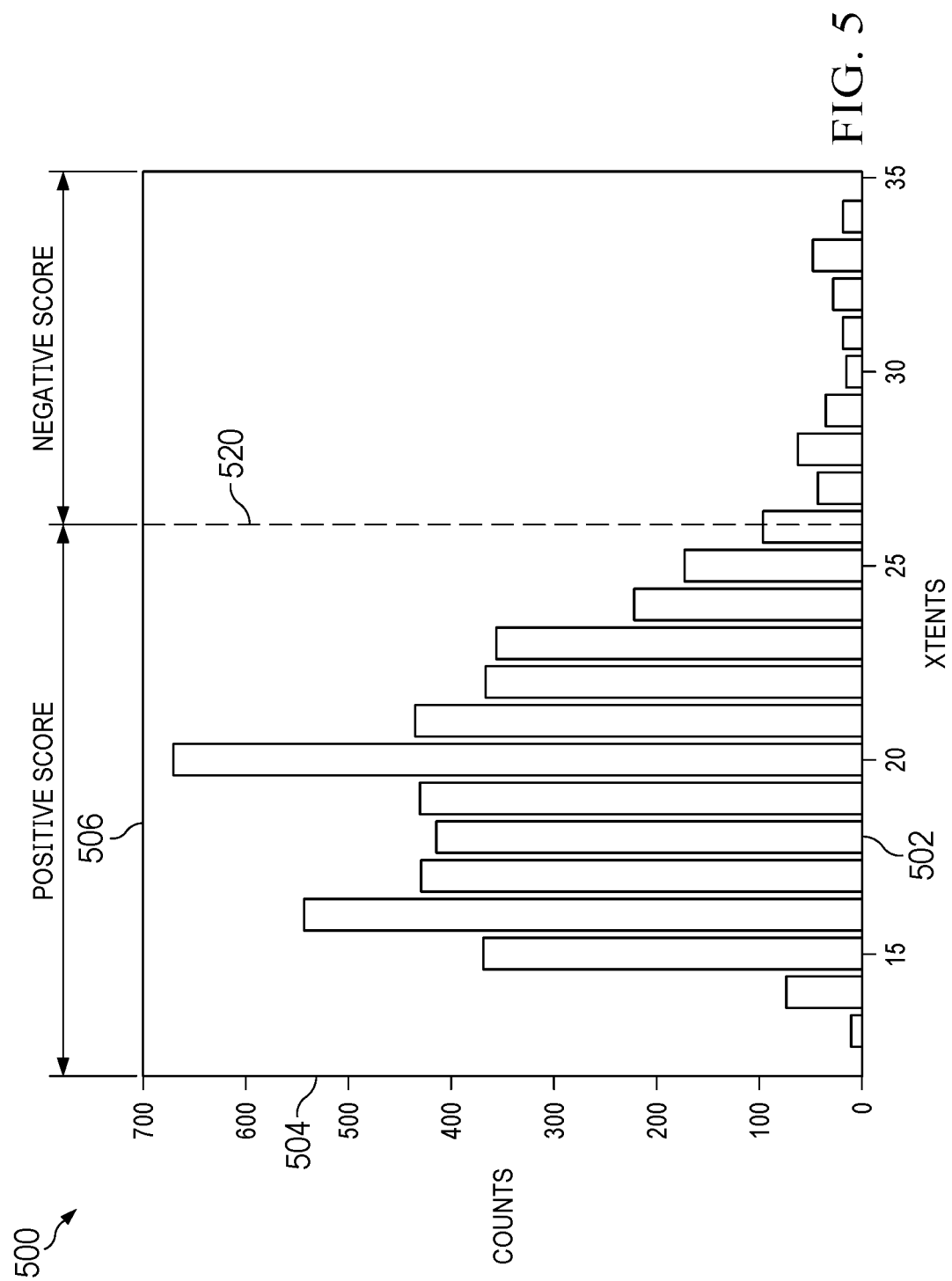
FIG. 5 is an illustration of a graph of image counts for a first pixel segment in accordance with an illustrative embodiment.

With reference next to FIG. 5, an illustration of a graph of image counts for a first pixel segment is depicted in accordance with an illustrative embodiment. In this illustrative example, graph 500 is a graph illustrating extents for a first pixel segment.

In graph 500, X axis 502 is extents and Y axis 504 is image count. In this illustrative example, first pixel segment 506 is a segment that can extend from 13 pixels to 34 pixels in this example.

In this example, segment threshold 520 is the threshold or dividing line for the size of extents between a long and short range to measuring ranges. A positive score is present for extents before segment threshold 520, which is an extent that is 26 pixels or less. Extents that are greater than 26 pixels have a negative score. The determination of scores is described with respect to FIG. 7 below.

In this example, first pixel segment 506 is for a target having an extent that is a smaller sized target as compared to a target with a larger size. In this example, first pixel segment 506 is for shorter-range targets as compared to a second pixel segment that includes extents greater than 25 pixels.

Figure 6:
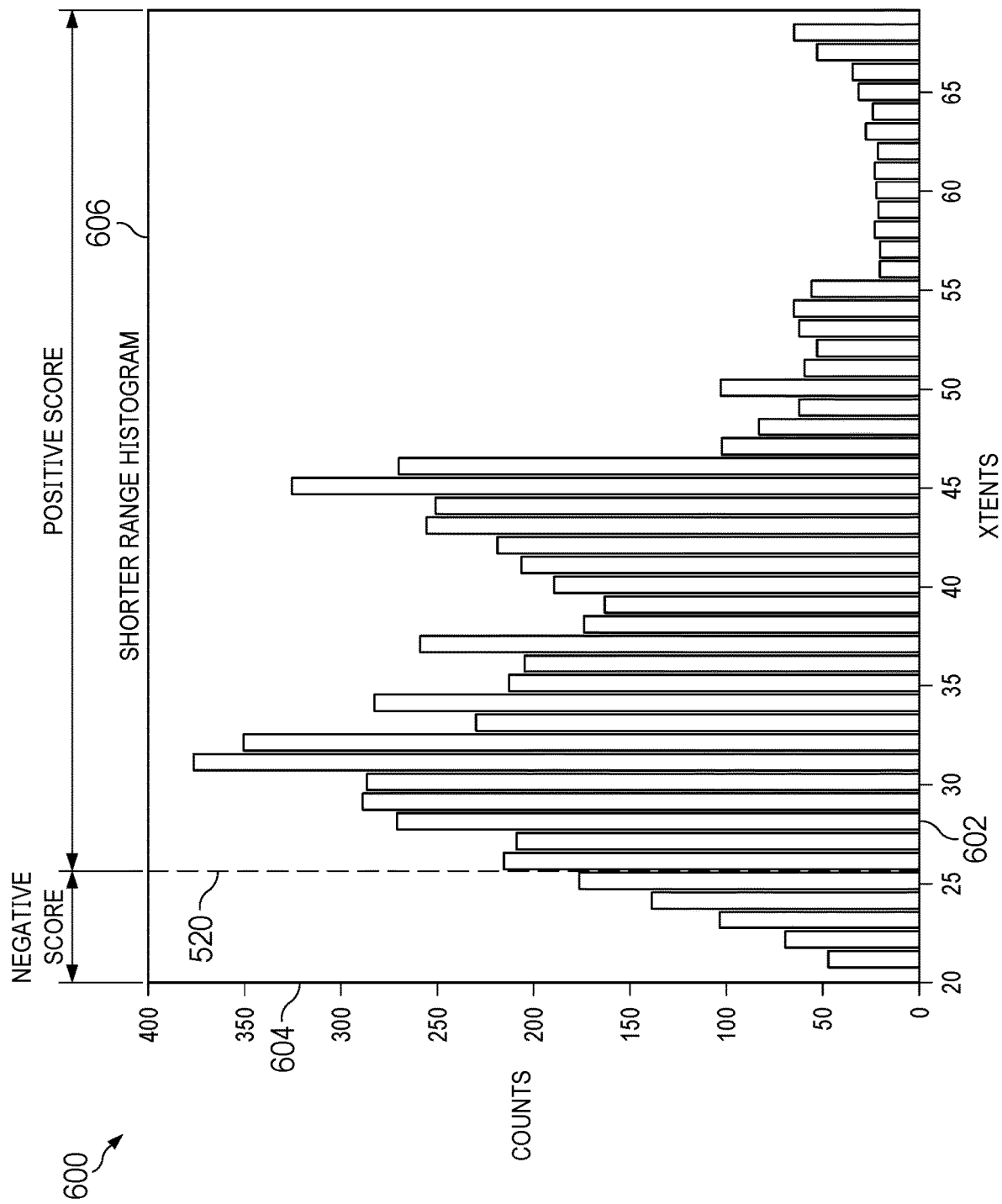
FIG. 6 is an illustration of a graph of image counts for second pixel segment in accordance with an illustrative embodiment.

Turning to FIG. 6, an illustration of a graph of image counts for second pixel segment is depicted in accordance with an illustrative embodiment. As depicted, graph 600 is a graph illustrating extents for a first pixel segment.

In graph 600, extents are on X axis 602 and image count are on Y axis 604. In this illustrative example, second pixel segment 606 is a segment of pixels that can extend from 20 pixels to 68 pixels in this example. In this example, segment threshold 520 is the threshold or dividing line between a long range and a short range for measuring ranges.

Segment threshold 520 is an intersection of scores between first pixel segment 506 in graph 500 and second pixel segment 606 in graph 600. In other words, the score is the same at segment threshold 520 and this threshold can be used to resize the segments such that the ranges do not overlap. In other words, first pixel segment 506 can be selected to be from 14 to 26 and second pixel segment 606 can be selected to be from greater than 26 to 68. In this example, segment threshold 520 is the dividing line between first pixel segment 506 and second pixel segment 606.

A positive score is present for extents that are greater than segment threshold 520, which is an extent with 26 pixels or greater. Extents 25 or less have a negative score. The determination of scores is described with respect to FIG. 7 below.

In this example, second pixel segment 606 is for a target that is a larger sized target as compared to a target with a smaller size. In this example, second pixel segment 606 is for shorter-range targets as compared to a first pixel segment 506 in FIG. 5, which is for longer range targets.

Scores can be generated different segment sizes for extents within first pixel segment 506 and within second pixel segment 606. The scores for the different segment lengths can be used to select the first pixel segment and the second pixel segment in the depicted examples.

Figures 7, 8:
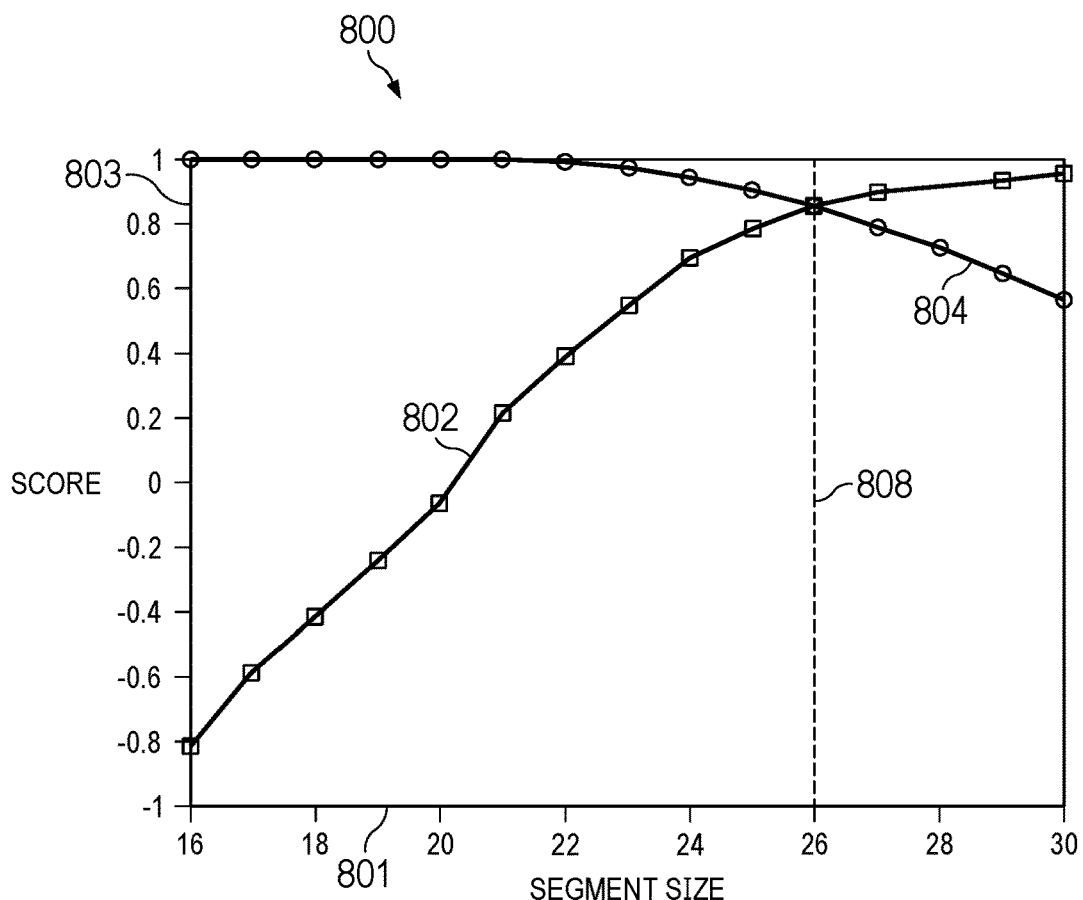
FIG. 7 is an illustration of equations for determining segment scores in accordance with an illustrative embodiment.
FIG. 8 is an illustration of a graph of scores for segment sizes in accordance with an illustrative embodiment.

Turning to FIG. 7, an illustration of equations for determining segment scores is depicted in accordance with an illustrative embodiment. As depicted, scores can be determined for a first pixel segment and a second pixel segment using the equations 700.

For example, a score for a first pixel segment can be determined using first pixel segment score equation 702. This score can be determined for first pixel segments of different lengths.

In first pixel segment score equation 702, Segment 1 score is the score for the first pixel segment. In this equation, $seg_{size}$ is a segment size and is the size of the pixel segment in pixels; k is a counter, $n_k$ is the number of occurrences for an extent; N is the total number of extents, min is the minimum value for an extent over all of the images, max is the maximum value for the extent over all if the images; and W is a weight value.

A score for the second pixel segment can be determined for different segment sizes for extents within second pixel segment 606 in FIG. 6. This score can be determined using second pixel segment score equation 704. In second pixel segment score equation 704, Segment 2 score is the score for second pixel segment. In this equation, $seg_{size}$ is a segment size and is the size of the pixel segment in pixels; k is a counter, $n_k$ is the number of occurrences for an extent; N is the total number of extents, min is the minimum value for an extent over all of the images, max is the maximum value for the extent over all of the images; and W is a weight value.

In this illustrative example, the pixel segment sizes for the first pixel segment and the second pixel segment are selected such that both pixel segments have scores that meet at a threshold value for the pixel size of an extent. In this example, the threshold can be selected where the scores for both segments are the same at the threshold identifying the extent size. In this illustrative example, the first pixel segment is selected to provide a positive score for longer ranges of an object as compared to the second pixel segment.

With reference now to FIG. 8, an illustration of a graph of scores for segment sizes is depicted in accordance with an illustrative embodiment. In graph 800, x axis 801 is segment size while the y axis 803 is the score for the segment size.

As depicted, line 802 is for a first pixel segment such as first pixel segment 506 and line 804 is for a second pixel segment such as second pixel segment 606. In this illustrative example, the segment sizes for first pixel segment 506 and second pixel segment 606 are selected where the lines intersect having the same score. In this example, the scores are positive.

In other words, the segment pixel size for the segments is selected to optimize the score for both segments in this example. This optimization is located at line 808 in this illustrative example. As depicted, line 808 is for a segment size of 26. The segment size can be the segment threshold indicating a transition from one segment to another segment that is best for both segments.

The same type of segment size selection can be applied for using additional segments in addition to the two segments illustrated. For example, this process can be applied to selecting optimal segment sizes for three pixel segments, 10 pixel segments, 35 pixel segments, or some other number of pixel segments.

Figure 9:
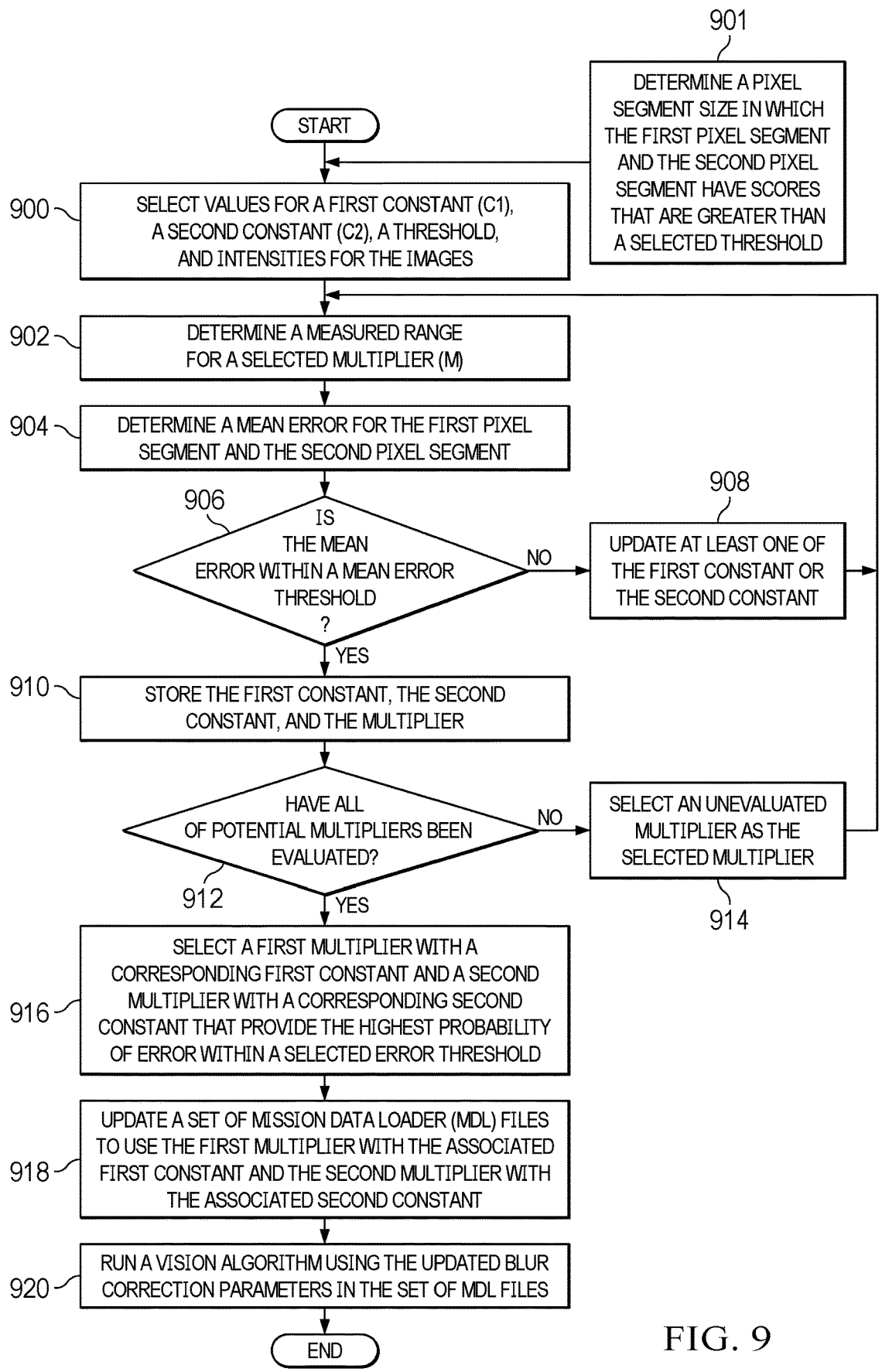
FIG. 9 is an illustration of a flowchart of a process for generating blur correction parameters in accordance with an illustrative embodiment.

Turning next to FIG. 9, an illustration of a flowchart of a process for generating blur correction parameters is depicted in accordance with an illustrative embodiment. The process in FIG. 9 can be implemented in hardware, software, or both. When implemented in software, the process can take the form of program instructions that is run by one of more processor units located in one or more hardware devices in one or more computer systems. For example, the process can be implemented in blur corrector 216 in computer system 214 in FIG. 2.

The process begins by selecting values for a first constant (C1), a second constant (C2), a threshold, and intensities for the images (operation 900). In this illustrative example, the threshold is a segment threshold identifying an extent size indicating the change from a first pixel segment to a second pixel segment. The segment threshold can be identified by the process of determining a pixel segment size in which the first pixel segment and the second pixel segment have scores that are greater than a selected threshold (operation 901).

The process determines a measured range for a selected multiplier (M) (operation 902). In operation 902, the blur range is determined using M, C1 and C2 as follows BR=M× Ln(intensity)+C. The blur range is used in the measured range determination to correct for blur.

The process determines a mean error for the first pixel segment and the second pixel segment (operation 904). In this operation, errors are determined between the measured range and truth range. A mean error is determined as an average of the error for all of the images both pixel segments.

The process determines whether the mean error is within a mean error threshold (operation 906). In this example, the mean error threshold can be any threshold level for a desired level of error. For example, the mean error threshold can be zero, 0.1, or some other value.

If mean error is not within a threshold for both constants, the process updates at least one of the first constant or the second constant (operation 908). In operation 908, one or both constants can be updated.

For example, if the first constant is within the mean threshold error and the second constant is not within the mean threshold error, the second constant is updated. This updating involves selecting a new constant for evaluation. In this illustrative example, the updating performed in operation 908 can be performed using a machine learning model to update at least one of the first constant or the second constant. The process then returns to operation 902 to evaluate the update of at least one of the first constant or the second constant with the same selected multiplier.

With reference again to operation 906, if the mean error is within the mean error threshold for both the first constant and the second constant, the process stores the first constant, the second constant, and the multiplier (operation 910).

A determination is made as to whether all of potential multipliers have been evaluated (operation 912). In operation 912, the process determines whether additional permutations are needed to evaluate potential additional multipliers. If all of the multipliers have not been evaluated, the process selects an unevaluated multiplier as the selected multiplier (operation 914). The process then returns to operation 902.

Otherwise, the process selects a first multiplier with a corresponding first constant and a second multiplier with a corresponding second constant that provide the highest probability of error within a selected error threshold (operation 916). In operation 916, the process selects the first multiplier with an associated first constant and a second multiplier with an associated second constant that results in the majority of images having an error within the selected error threshold.

The process updates a set of mission data loader (MDL) files to use the first multiplier with the associated first constant and the second multiplier with the associated second constant (operation 918).

The process then runs a vision algorithm using the updated blur correction parameters in the set of MDL files (operation 920). The process terminates thereafter.

In operation 920, the vision algorithm can be, for example, a STAR Silhouette algorithm. In operation 920, the use of the vision algorithm can be in actual range detection for a platform. In another illustrative example, the algorithm can be run to determine whether a desired level of accuracy is present.

Figure 10:
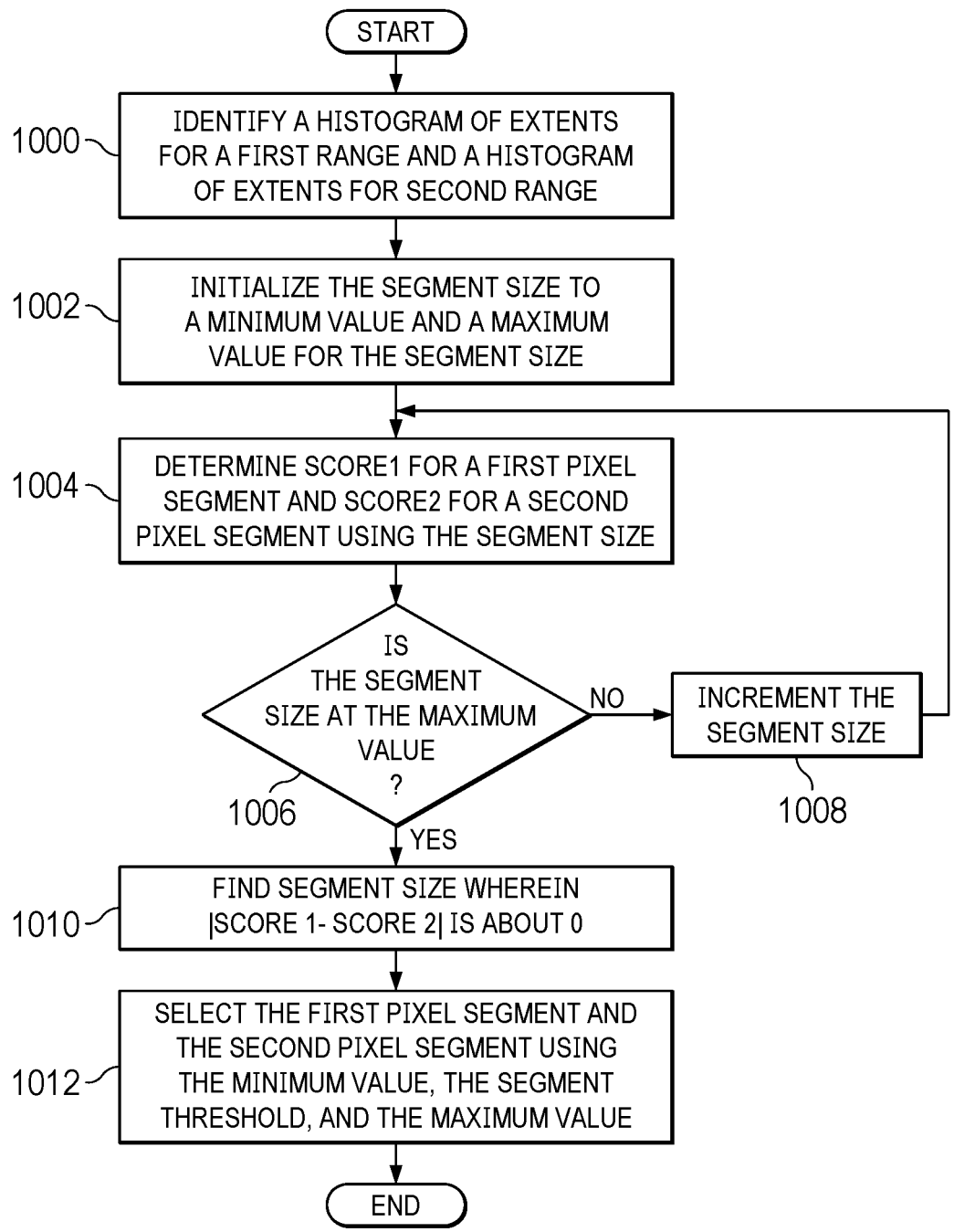
FIG. 10 is an illustration of a flowchart of a process for selecting pixel segment sizes in accordance with an illustrative embodiment.

With reference now to FIG. 10, an illustration of a flowchart of a selecting pixel segment sizes is depicted in accordance with an illustrative embodiment. The process in FIG. 10 can be implemented in hardware, software, or both. When implemented in software, the process can take the form of program instructions that is run by one of more processor units located in one or more hardware devices in one or more computer systems. For example, the process can be implemented in blur corrector 216 in computer system 214 in FIG. 2.

The process begins by identifying a histogram of extents for a first range and a histogram of extents for second range (operation 1000). In operation 1000, the histograms can be for a first pixel segment for the first range and for a second pixel segment for the second range in which the first range is longer than the second range. Graph 500 in FIG. 5 and graph 600 in FIG. 6 are examples of histograms for a first range and a second range. These histograms include data for the number of images in which a particular extent is present.

The process initializes the segment size to a minimum value and a maximum value for the segment size (operation 1002). In this illustrative example, the minimum and maximum value can be determined in a number of different ways. For example, the minimum value for the segment size can be the minimum between the overlap in the two histograms. The maximum value can be maximum between the overlap in the histograms. For example, in graph 500 in FIG. 5 and graph 600 in FIG. 6, minimum for the overlap is the smallest value for an extent where both segments have counts. In FIG. 5 and FIG. 6, minimum where both segments have counts is for an extent of 20 pixels. In this example, the maximum value for the overlap between the two graphs is the largest extent where both segments have counts. In the example, in FIG. 5 and FIG. 6, the maximum is 34. In one illustrative example, the minimum in the histograms shown in graph 500 in FIG. 5 and graph 600 in FIG. 6 can be from about 20 pixels to about 35 pixels.

The process determines score1 for a first pixel segment and score2 for a second pixel segment using the segment size (operation 1004). In operation 1004, score1 can be determined using first pixel segment score equation 702 in FIG. 7. In this example, score2 can be determined using second pixel segment score equation 704 in FIG. 7.

A determination is made as to whether the segment size is at the maximum value (step 1006). If the segment size is not at the maximum value, the process increments the segment size (operation 1008). In operation 1008, the segment size is incremented by one. The process then returns to operation 1004.

With reference again to operation 1006, if the segment size is at the maximum, the process finds segment size wherein |score 1−score 2| is about 0 (operation 1010). In operation 1010, all of scores for the different segment sizes are examined. The pixel segment size identified in operation 1010 is the segment pixel threshold between the first pixel segment and the second pixel segment.

The process then selects the first pixel segment and the second pixel segment using the minimum value, the segment threshold, and the maximum value (operation 1012). The process terminates thereafter. In operation 1012, the first pixel segment extends from the minimum value to the segment threshold. The second pixel segment extends from the segment threshold to the maximum value.

Figure 11:
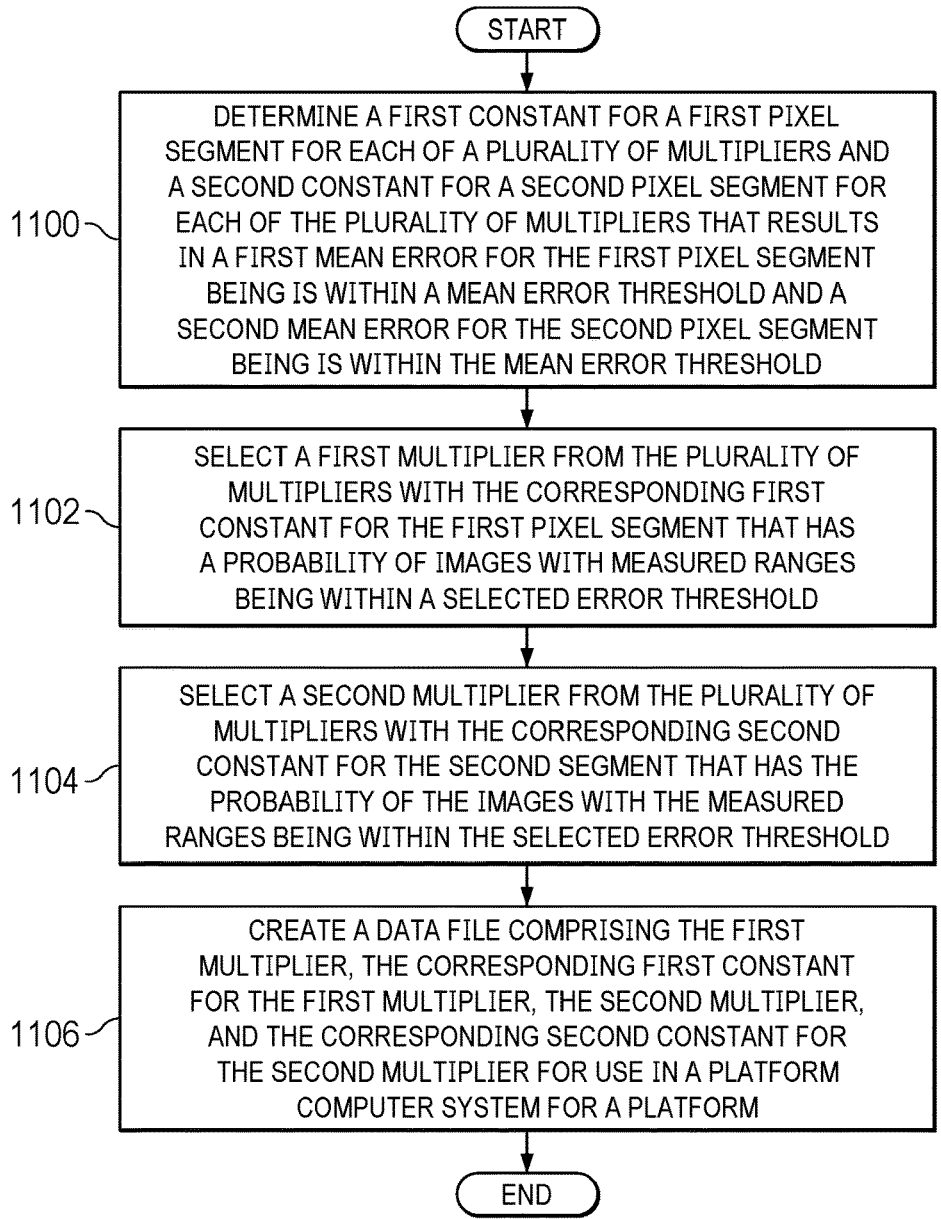
FIG. 11 is an illustration of a flowchart of a process for blur correction in accordance with an illustrative embodiment.

Turning next to FIG. 11, an illustration of a flowchart of a process for blur correction is depicted in accordance with an illustrative embodiment. The process in FIG. 11 can be implemented in hardware, software, or both. When implemented in software, the process can take the form of program instructions that is run by one of more processor units located in one or more hardware devices in one or more computer systems. For example, the process can be implemented in blur corrector 216 in computer system 214 in FIG. 2.

The process begins by determining a first constant for a first pixel segment for each of a plurality of multipliers and a second constant for a second pixel segment for each of the plurality of multipliers that results in a first mean error for the first pixel segment being within a mean error threshold and a second mean error for the second pixel segment being within the mean error threshold (operation 1100). In operation 1100, each of the plurality of multipliers and a corresponding first constant are used to determine a first blur radius for the first pixel segment and each of the plurality of multipliers and a corresponding second constant are used to determine a second blur radius for a second segment.

The process selects a first multiplier from the plurality of multipliers with the corresponding first constant for the first pixel segment that has a probability of images with measured ranges being within a selected error threshold (operation 1102). The process selects a second multiplier from the plurality of multipliers with the corresponding second constant for the second segment that has the probability of the images with the measured ranges being within the selected error threshold (operation 1104).

The process creates a data file comprising the first multiplier, the corresponding first constant for the first multiplier, the second multiplier, and the corresponding second constant for the second multiplier for use in a platform computer system for a platform (operation 1106). The process terminates thereafter.

Figure 12:
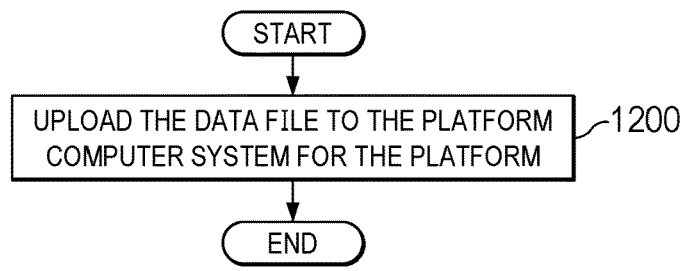
FIG. 12 is an illustration of a flowchart of a process for uploading a data file to a platform computer system in accordance with an illustrative embodiment.

Turning to FIG. 12, an illustration of a flowchart of a process for uploading a data file to a platform computer system is depicted in accordance with an illustrative embodiment. The operation in FIG. 12 is an example of an additional operation that can be used with the operations in the process in FIG. 11. The process uploads the data file to the platform computer system for the platform (operation 1200). The process terminates thereafter.

Figure 13:
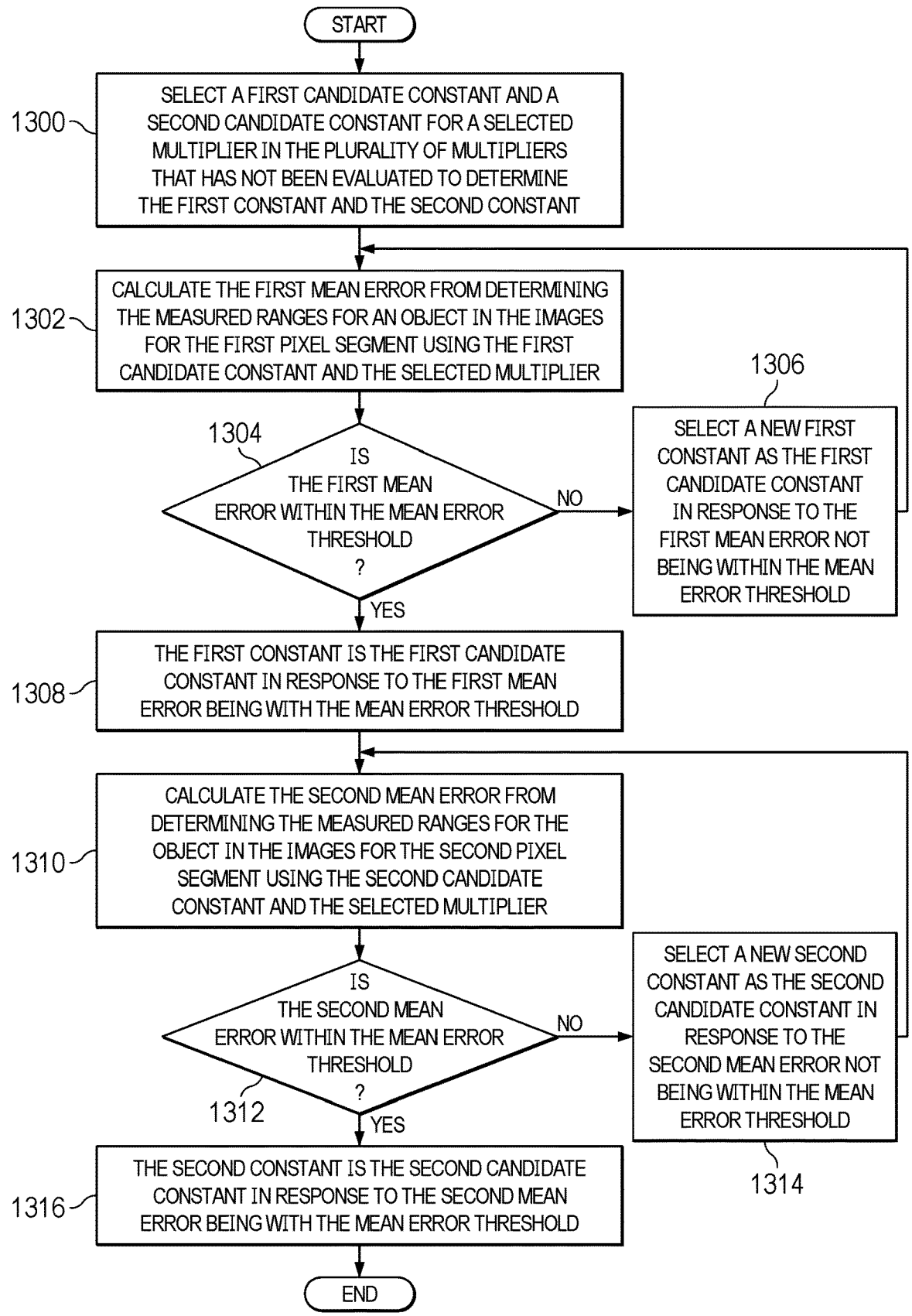
FIG. 13 is an illustration of a flowchart of a process for determining constants in accordance with an illustrative embodiment.

With reference to FIG. 13, an illustration of a flowchart of a process for determining constants is depicted in accordance with an illustrative embodiment. The process in FIG. 13 is an example of an implementation of operation 1100 in FIG. 11.

The process begins by selecting a first candidate constant and a second candidate constant for a selected multiplier in the plurality of multipliers that has not been evaluated to determine the first constant and the second constant (operation 1300). The process calculates the first mean error from determining the measured ranges for an object in the images for the first pixel segment using the first candidate constant and the selected multiplier (operation 1302).

A determination is made as to whether the first mean error is within the mean error threshold (operation 1304). If the first mean error is not within the mean threshold, the process selects a new first constant as the first candidate constant in response to the first mean error not being within the mean error threshold (operation 1306). The process then returns to operation 1302.

Otherwise, the first constant is the first candidate constant in response to the first mean error being with the mean error threshold (operation 1308). The process calculates the second mean error from determining the measured ranges for the object in the images for the second pixel segment using the second candidate constant and the selected multiplier (operation 1310).

A determination is made as to whether the second mean error is within the mean error threshold (operation 1312). If the second mean error is not within the mean error threshold, the process selects a new second constant as the second candidate constant in response to the second mean error not being within the mean error threshold (operation 1314). The process then returns to operation 1310.

With reference again to operation 1312, if the second mean error is within the mean error threshold, the second constant is the second candidate constant in response to the second mean error being with the mean error threshold (operation 1316). The process terminates thereafter.

Figure 14:
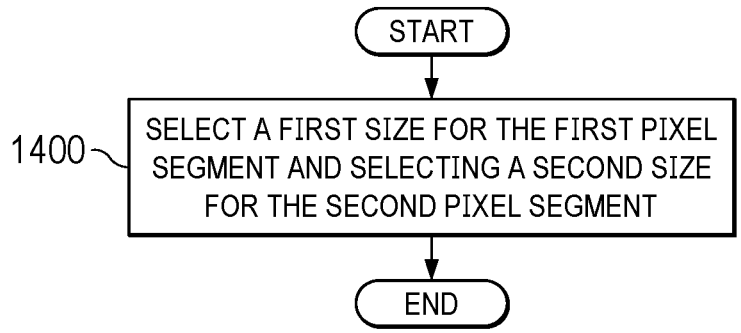
FIG. 14 is an illustration of a flowchart of a process for selecting sizes for pixel segments in accordance with an illustrative embodiment.

With reference to FIG. 14, an illustration of a flowchart of a process for selecting sizes for pixel segments is depicted in accordance with an illustrative embodiment. The operation in FIG. 14 is an example of an additional operation that can be used with the operations in the process in FIG. 11. The process selecting a first size for the first pixel segment and selecting a second size for the second pixel segment, wherein the first pixel segment and the second pixel segment have both have a score that is above a threshold (operation 1400). The process terminates thereafter.

Figure 15:
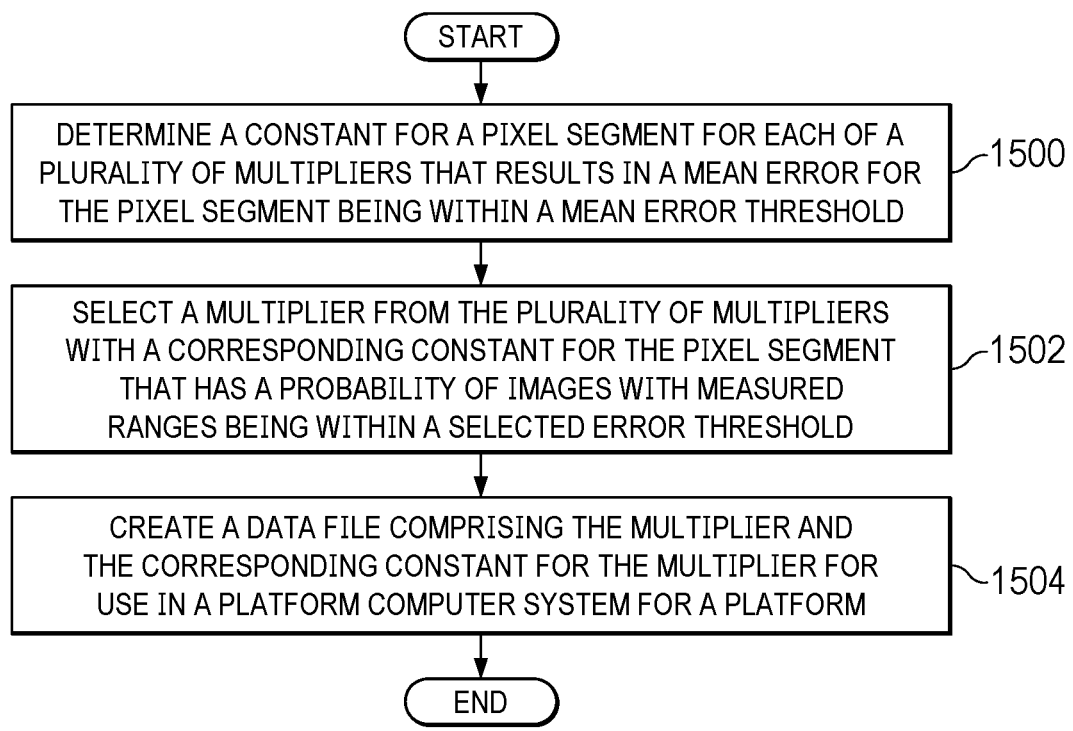
FIG. 15 is an illustration of a flowchart of a process for blur correction in accordance with an illustrative embodiment.

Turning next to FIG. 15, an illustration of a flowchart of a process for blur correction is depicted in accordance with an illustrative embodiment. The process in FIG. 15 can be implemented in hardware, software, or both. When implemented in software, the process can take the form of program instructions that is run by one of more processor units located in one or more hardware devices in one or more computer systems. For example, the process can be implemented in blur corrector 216 in computer system 214 in FIG. 2.

The process begins by determining a constant for pixel segment for each of a plurality of multipliers that results in a mean error for the pixel segment being within a mean error threshold (operation 1500). In operation 1500, each of the plurality of multipliers and a corresponding constant are used to determine a blur radius for the pixel segment. The process selects a multiplier from the plurality of multipliers with the corresponding first constant for the first pixel segment that has a probability of images with measured ranges being within a selected error threshold (operation 1502).

The process creates a data file comprising the first multiplier and the corresponding first constant for the first multiplier for use in a platform computer system for a platform (operation 1504). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 16:
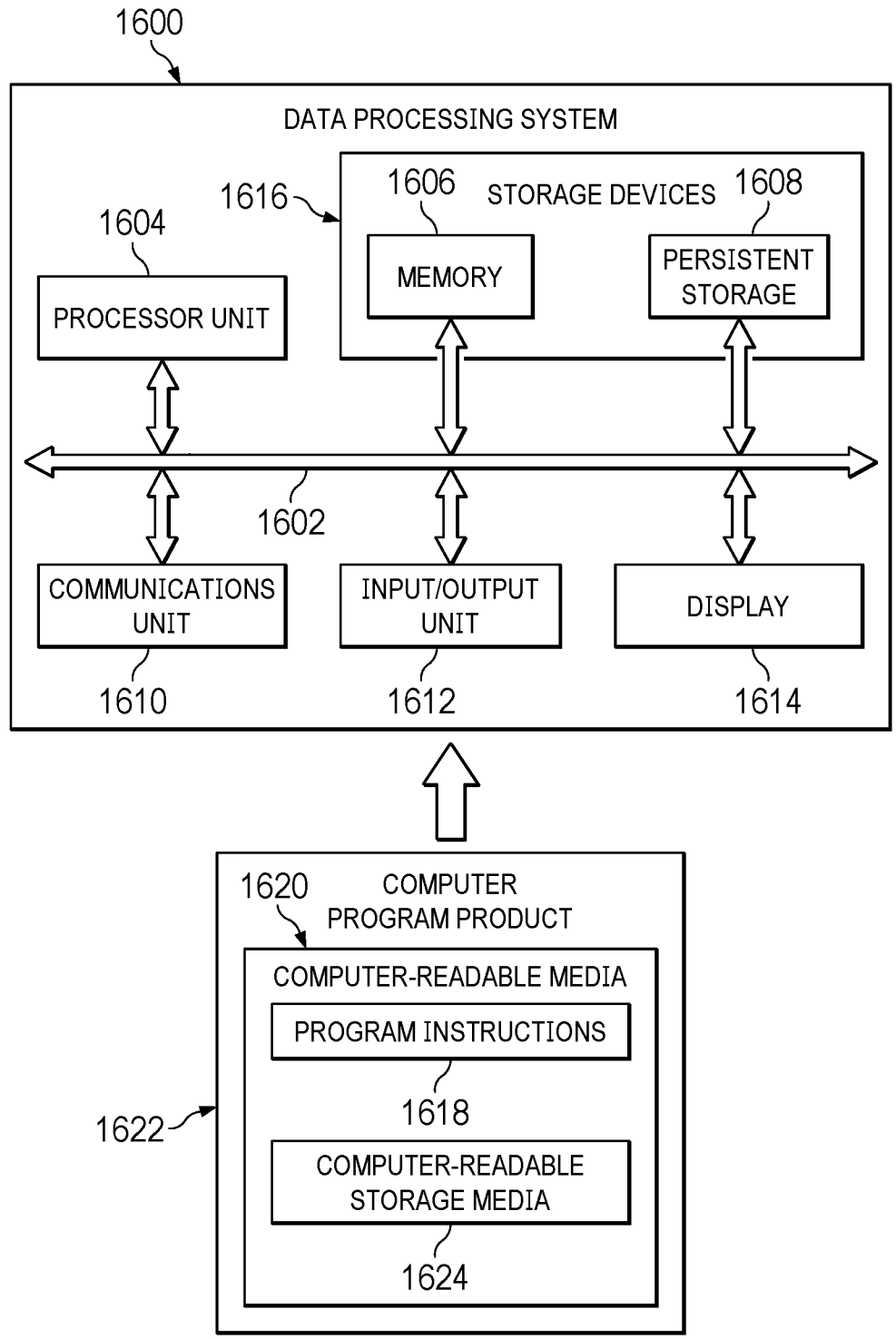
FIG. 16 is an illustration of a block diagram of a data processing system in accordance with an illustrative embodiment.

Turning now to FIG. 16, a block diagram of a data processing system is depicted in accordance with an illustrative embodiment. Data processing system 1600 can be used to implement server computer 104, server computer 106, client devices 110, in FIG. 1. Data processing system 1600 can also be used to implement computer system 214 and platform computer system 262 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer readable program instructions that can be read and executed by a processor in processor unit 1604. The program instructions in the different embodiments can be embodied on different physical or computer readable storage media, such as memory 1606 or persistent storage 1608.

Program instructions 1618 is located in a functional form on computer readable media 1620 that is selectively removable and can be loaded onto or transferred to data processing system 1600 for execution by processor unit 1604. Program instructions 1618 and computer readable media 1620 form computer program product 1622 in these illustrative examples. In the illustrative example, computer readable media 1620 is computer readable storage media 1624.

Computer-readable storage media 1624 is a physical or tangible storage device used to store program instructions 1618 rather than a medium that propagates or transmits program instructions 1618. Computer readable storage media 1624 may be at least one of an electronic storage media, a magnetic storage media, an optical storage media, an electromagnetic storage media, a semiconductor storage media, a mechanical storage media, or other physical storage media. Some known types of storage devices that include these medias include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer readable storage media 1624, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1618 can be transferred to data processing system 1600 using a computer readable signal media. The computer readable signal media are signals and can be, for example, a propagated data signal containing program instructions 1618. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1620" can be singular or plural. For example, program instructions 1618 can be located in computer readable media 1620 in the form of a single storage device or system. In another example, program instructions 1618 can be located in computer readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer readable media 1620 in a server computer while another portion of program instructions 1618 can be located in computer readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Some features of the illustrative examples are described in the following clauses. These clauses are examples of features and are not intended to limit other illustrative examples.

Clause 1

A method for blur correction, the method comprising:
determining a first constant for a first pixel segment for each of a plurality of multipliers and a second constant for a second pixel segment for each of the plurality of multipliers that results in a first mean error for the first pixel segment being within a mean error threshold and a second mean error for the second pixel segment being within the mean error threshold, wherein each of the plurality of multipliers and a corresponding first constant are used to determine a first blur radius for the first pixel segment and each of the plurality of multipliers and a corresponding second constant are used to determine a second blur radius for a second segment;
selecting a first multiplier from the plurality of multipliers with the corresponding first constant for the first pixel segment that has a probability of images with measured ranges being within a selected error threshold;
selecting a second multiplier from the plurality of multipliers with the corresponding second constant for the second segment that has the probability of the images with the measured ranges being within the selected error threshold; and
creating a data file comprising the first multiplier, the corresponding first constant for the first multiplier, the second multiplier, and the corresponding second constant for the second multiplier for use in a platform computer system for a platform.

Clause 2

The method according to clause 1 further comprising:
uploading the data file to the platform computer system for the platform.

Clause 3

The method according to clause 2, wherein the platform computer system determines measured ranges using the data file.

Clause 4

The method according to clauses 1, 2, or 3, wherein determining the first constant for the first pixel segment for each of the plurality of multipliers and the second constant for the second pixel segment for each of the plurality of multipliers that results in the first mean error for the first pixel segment being within the mean error threshold and the second mean error for the second pixel segment being within the mean error threshold comprises:
selecting a first candidate constant and a second candidate constant for a selected multiplier in the plurality of multipliers that has not been evaluated to determine the first constant and the second constant;
calculating the first mean error from determining the measured ranges for an object in the images for the first pixel segment using the first candidate constant and the selected multiplier;
selecting a new first constant as the first candidate constant in response to the first mean error not being within the mean error threshold;
repeating the calculating and selecting steps for the first candidate constant until the first mean error is within the mean error threshold, wherein the first constant is the first candidate constant in response the first mean error being with the mean error threshold;
calculating the second mean error from determining the measured ranges for the object in the images for the second pixel segment using the second candidate constant and the selected multiplier;
selecting a new second constant as the second candidate constant in response to the first mean error not being within the mean error threshold; and
repeating the calculating and selecting steps for the second candidate constant until the second mean error is within the mean error threshold, wherein the second constant is with the second candidate constant in response the first mean error being with the mean error threshold.

Clause 5

The method according to clauses 1, 2, 3, or 4 further comprising:
selecting a first size for the first pixel segment and selecting a second size for the second pixel segment, wherein the first pixel segment and the second pixel segment have both have a score that is above a threshold.

Clause 6

The method according to clauses 1, 2, 3, 4, or 5, wherein the images are generated by a camera in the platform.

Clause 7

The method according to clauses 1, 2, 3, 4, 5, or 6, wherein a segment threshold identifies a change from the first pixel segment to the second segment.

Clause 8

The method according to clause 7, wherein the first multiplier and the corresponding first constant for the first multiplier are used to determine a measured range when an extent for a shape in an image is less than or equal to the segment threshold and wherein the second multiplier and the corresponding second constant for the second multiplier are used to determine the measured range when the extent for the shape in the image is greater than the segment threshold.

Clause 9

The method according to clauses 1, 2, 3, 4, 5, 6, 7 or 8, wherein the data file is a mission data loader file.

Clause 10

The method according to clauses 1, 2, 3, 4, 5, 6, 7, 8, or 9, wherein the data file further comprises a library of known extents for shapes of objects corresponding to known ranges to the objects.

Clause 11

A blur correction system comprising:

a computer system;

a blur corrector located in the computer system, wherein the blur corrector is configured to:

determine a first constant for a first pixel segment for each of a plurality of multipliers and a second constant for a second pixel segment for each of the plurality of multipliers that results in a first mean error for the first pixel segment being within a mean error threshold and a second mean error for the second pixel segment being within the mean error threshold, wherein each of the plurality of multipliers and a corresponding first constant are used to determine a first blur radius for the first pixel segment and each of the plurality of multipliers and a corresponding second constant are used to determine a second blur radius for a second segment;

select a first multiplier from the plurality of multipliers with the corresponding first constant for the first pixel segment that has a probability of images with measured ranges being within a selected error threshold;

select a second multiplier from the plurality of multipliers with the corresponding second constant for the second segment that has the probability of the images with the measured ranges being within the selected error threshold; and create a data file comprising the first multiplier, the corresponding first constant for the first multiplier, the second multiplier, and the corresponding second constant for the second multiplier for use in a platform computer system for a platform.

Clause 12

The blur correction system according to clause 11, wherein the blur corrector is configured to:

upload the data file to the platform computer system for the platform.

Clause 13

The blur correction system according to clause 12, wherein the platform computer system determines measured ranges using the data file.

Clause 14

The blur correction system according to clauses 11 or 12, wherein in determining the first constant for the first pixel segment for each of the plurality of multipliers and the second constant for the second pixel segment for each of the plurality of multipliers that results in the first mean error for the first pixel segment being within the mean error threshold and the second mean error for the second pixel segment being within the mean error threshold, the blur corrector is configured to:

select a first candidate constant and a second candidate constant for a selected multiplier in the plurality of multipliers that has not been evaluated to determine the first constant and the second constant;

calculate the first mean error from determining the measured ranges for an object in the images for the first pixel segment using the first candidate constant and the selected multiplier;

select a new first constant as the first candidate constant in response to the first mean error not being within the mean error threshold;

repeat the calculating and selecting for the first candidate constant until the first mean error is within the mean error threshold, wherein the first constant is first candidate constant in response the first mean error being with the mean error threshold;

calculating the second mean error from determining the measured ranges for the object in the images for the second pixel segment using the second candidate constant and the selected multiplier;

selecting a new second constant as the second candidate constant in response to the first mean error not being within the mean error threshold; and repeating the calculating and selecting for the second candidate constant until the second mean error is within the mean error threshold, wherein the first constant is with the first candidate constant in response the first mean error being with the mean error threshold.

Clause 15

The blur correction system according to clauses 11, 12, 13, or 14, wherein the blur corrector is configured to:

select a first size for the first pixel segment and selecting a second size for the second pixel segment, wherein the first pixel segment and the second pixel segment have both have a score that is above a threshold.

Clause 16

The blur correction system according to clauses 11, 12, 13, 14, or 15, wherein the images are generated by a camera in the platform.

Clause 17

The blur correction system according to clauses 11, 12, 13, 14, 15, or 16, wherein a segment threshold identifies a change from the first pixel segment to the second segment.

Clause 18

The blur correction system according to clause 17, wherein the first multiplier and the corresponding first constant for the first multiplier are used to determine a measured range when an extent for a shape in an image is less than or equal to the segment threshold and wherein the second multiplier and the corresponding second constant for the second multiplier are used to determine the measured range when the extent for the shape in the image is greater than the segment threshold.

Clause 19

The blur correction system according to clauses 11, 12, 13, 14, 15, 16, 17, or 18, wherein the data file is a mission data loader file.

Clause 20

The blur correction system according to clauses 11, 12, 13, 14, 15, 16, 17, 18, or 19, wherein the data file further comprises a library of known extents for shapes of objects corresponding to known ranges to the objects.

Clause 21

A method for blur correction, the method comprising:

determining a constant for a pixel segment for each of a plurality of multipliers that results in a mean error for the pixel segment being within a mean error threshold, wherein each of the plurality of multipliers and a corresponding constant are used to determine a blur radius for the pixel segment;

selecting a multiplier from the plurality of multipliers with a corresponding constant for the pixel segment that has a probability of images with measured ranges being within a selected error threshold; and creating a data file comprising the multiplier and the corresponding constant for the multiplier for use in a platform computer system for a platform.

Thus, the illustrative examples provide a method, apparatus, system, and computer program product for correcting blur in images. In one illustrative example, a method for blur correction determines a first constant for a first pixel segment and a second constant for a second pixel segment for each of the multipliers that results in a first mean error for the first pixel segment being within a mean error threshold and a second mean error for the second pixel segment being within the mean error threshold. A first multiplier is selected from the multipliers with the corresponding first constant for the first pixel segment and second multiplier is selected from the multipliers with the corresponding second constant for the second segment that has the probability of the frames with the measured ranges being within the selected error threshold. A data file comprising the first multiplier, the corresponding first constant for the first multiplier, the second multiplier, and the corresponding second constant for the second multiplier is created for a platform computer system for a platform.

The illustrative examples provide blur correction parameters that can be used to correct for blur at different intensities. As a result, the measured range determined from the images are closer to the truth or actual value for the range or distance to an object. In this manner, blur correction parameters 219 can be generated for platforms which more quickly as compared to human operators. This ability to generate blur correction parameters includes an ability to generate blur correction parameters in real time or dynamically.

For example, when a particular object is not found in a range library the in a platform, blur correction parameters for the object can be identified by blur corrector 216. Blur corrector 216 can dynamically or in real time generate updated blur correction parameters to include the new object and upload a data file to the platform for use in determining ranges to the object.

As a result, improvements in range determination can occur for various platforms including satellites, space stations, vehicles, trains, buildings, cargo airplanes, ships, and other types of platforms. Further, with the use of blur correction parameters as determined using a blur corrector in the illustrative examples, the accuracy of passive range measurement can be increased reducing the need for active range measurement systems.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for blur correction, the method comprising:
   determining a first constant for a first pixel segment for each of a plurality of multipliers and a second constant for a second pixel segment for each of the plurality of multipliers that results in a first mean error for the first pixel segment being within a mean error threshold and a second mean error for the second pixel segment being within the mean error threshold, wherein each of the plurality of multipliers and a corresponding first constant are used to determine a first blur radius for the first pixel segment and each of the plurality of multipliers and a corresponding second constant are used to determine a second blur radius for a second segment;
   selecting a first multiplier from the plurality of multipliers with the corresponding first constant for the first pixel segment that has a probability of images with measured ranges being within a selected error threshold;
   selecting a second multiplier from the plurality of multipliers with the corresponding second constant for the second segment that has the probability of the images with the measured ranges being within the selected error threshold; and
   creating a data file comprising the first multiplier, the corresponding first constant for the first multiplier, the second multiplier, and the corresponding second constant for the second multiplier for use in a platform computer system for a platform.

2. The method of claim 1 further comprising:
   uploading the data file to the platform computer system for the platform.

3. The method of claim 2, wherein the platform computer system determines measured ranges using the data file.

4. The method of claim 1, wherein determining the first constant for the first pixel segment for each of the plurality of multipliers and the second constant for the second pixel segment for each of the plurality of multipliers that results in the first mean error for the first pixel segment being within the mean error threshold and the second mean error for the second pixel segment being within the mean error threshold comprises:
   selecting a first candidate constant and a second candidate constant for a selected multiplier in the plurality of multipliers that has not been evaluated to determine the first constant and the second constant;
   calculating the first mean error from determining the measured ranges for an object in the images for the first pixel segment using the first candidate constant and the selected multiplier;
   selecting a new first constant as the first candidate constant in response to the first mean error not being within the mean error threshold;
   repeating the calculating and selecting steps for the first candidate constant until the first mean error is within the mean error threshold, wherein the first constant is the first candidate constant in response the first mean error being with the mean error threshold;
   calculating the second mean error from determining the measured ranges for the object in the images for the second pixel segment using the second candidate constant and the selected multiplier;
   selecting a new second constant as the second candidate constant in response to the first mean error not being within the mean error threshold; and
   repeating the calculating and selecting steps for the second candidate constant until the second mean error is within the mean error threshold, wherein the second constant is with the second candidate constant in response the first mean error being with the mean error threshold.

5. The method of claim 1 further comprising:
selecting a first size for the first pixel segment and selecting a second size for the second pixel segment, wherein the first pixel segment and the second pixel segment have both have a score that is above a threshold.

6. The method of claim 1, wherein the images are generated by a camera in the platform.

7. The method of claim 1, wherein a segment threshold identifies a change from the first pixel segment to the second segment.

8. The method of claim 7, wherein the first multiplier and the corresponding first constant for the first multiplier are used to determine a measured range when an extent for a shape in an image is less than or equal to the segment threshold and wherein the second multiplier and the corresponding second constant for the second multiplier are used to determine the measured range when the extent for the shape in the image is greater than the segment threshold.

9. The method of claim 1, wherein the data file is a mission data loader file.

10. The method of claim 1, wherein the data file further comprises a library of known extents for shapes of objects corresponding to known ranges to the objects.

11. A blur correction system comprising:
a computer system;
a blur corrector located in the computer system, wherein the blur corrector is configured to:
determine a first constant for a first pixel segment for each of a plurality of multipliers and a second constant for a second pixel segment for each of the plurality of multipliers that results in a first mean error for the first pixel segment being within a mean error threshold and a second mean error for the second pixel segment being within the mean error threshold, wherein each of the plurality of multipliers and a corresponding first constant are used to determine a first blur radius for the first pixel segment and each of the plurality of multipliers and a corresponding second constant are used to determine a second blur radius for a second segment;
select a first multiplier from the plurality of multipliers with the corresponding first constant for the first pixel segment that has a probability of images with measured ranges being within a selected error threshold;
select a second multiplier from the plurality of multipliers with the corresponding second constant for the second segment that has the probability of the images with the measured ranges being within the selected error threshold; and
create a data file comprising the first multiplier, the corresponding first constant for the first multiplier, the second multiplier, and the corresponding second constant for the second multiplier for use in a platform computer system for a platform.

12. The blur correction system of claim 11, wherein the blur corrector is configured to:
upload the data file to the platform computer system for the platform.

13. The blur correction system of claim 12, wherein the platform computer system determines measured ranges using the data file.

14. The blur correction system of claim 11, wherein in determining the first constant for the first pixel segment for each of the plurality of multipliers and the second constant for the second pixel segment for each of the plurality of multipliers that results in the first mean error for the first pixel segment being within the mean error threshold and the second mean error for the second pixel segment being within the mean error threshold, the blur corrector is configured to:
select a first candidate constant and a second candidate constant for a selected multiplier in the plurality of multipliers that has not been evaluated to determine the first constant and the second constant;
calculate the first mean error from determining the measured ranges for an object in the images for the first pixel segment using the first candidate constant and the selected multiplier;
select a new first constant as the first candidate constant in response to the first mean error not being within the mean error threshold;
repeat the calculating and selecting for the first candidate constant until the first mean error is within the mean error threshold, wherein the first constant is first candidate constant in response the first mean error being with the mean error threshold;
calculating the second mean error from determining the measured ranges for the object in the images for the second pixel segment using the second candidate constant and the selected multiplier;
selecting a new second constant as the second candidate constant in response to the first mean error not being within the mean error threshold; and
repeating the calculating and selecting for the second candidate constant until the second mean error is within the mean error threshold, wherein the first constant is with the first candidate constant in response the first mean error being with the mean error threshold.

15. The blur correction system of claim 11, wherein the blur corrector is configured to:
select a first size for the first pixel segment and selecting a second size for the second pixel segment, wherein the first pixel segment and the second pixel segment have both have a score that is above a threshold.

16. The blur correction system of claim 11, wherein the images are generated by a camera in the platform.

17. The blur correction system of claim 11, wherein a segment threshold identifies a change from the first pixel segment to the second segment.

18. The blur correction system of claim 17, wherein the first multiplier and the corresponding first constant for the first multiplier are used to determine a measured range when an extent for a shape in an image is less than or equal to the segment threshold and wherein the second multiplier and the corresponding second constant for the second multiplier are used to determine the measured range when the extent for the shape in the image is greater than the segment threshold.

19. The blur correction system of claim 11, wherein the data file is a mission data loader file.

20. The blur correction system of claim 11, wherein the data file further comprises a library of known extents for shapes of objects corresponding to known ranges to the objects.

21. A method for blur correction, the method comprising:
determining a constant for a pixel segment for each of a plurality of multipliers that results in a mean error for the pixel segment being within a mean error threshold, wherein each of the plurality of multipliers and a corresponding constant are used to determine a blur radius for the pixel segment;
selecting a multiplier from the plurality of multipliers with a corresponding constant for the pixel segment that has a probability of images with measured ranges being within a selected error threshold; and creating a data file comprising the multiplier and the corresponding constant for the multiplier for use in a platform computer system for a platform.

\* \* \* \* \*